Dec. 20, 1955 A. J. HOOD 2,727,505
PORTABLE BARBECUE
Filed Sept. 24, 1951 2 Sheets-Sheet 1
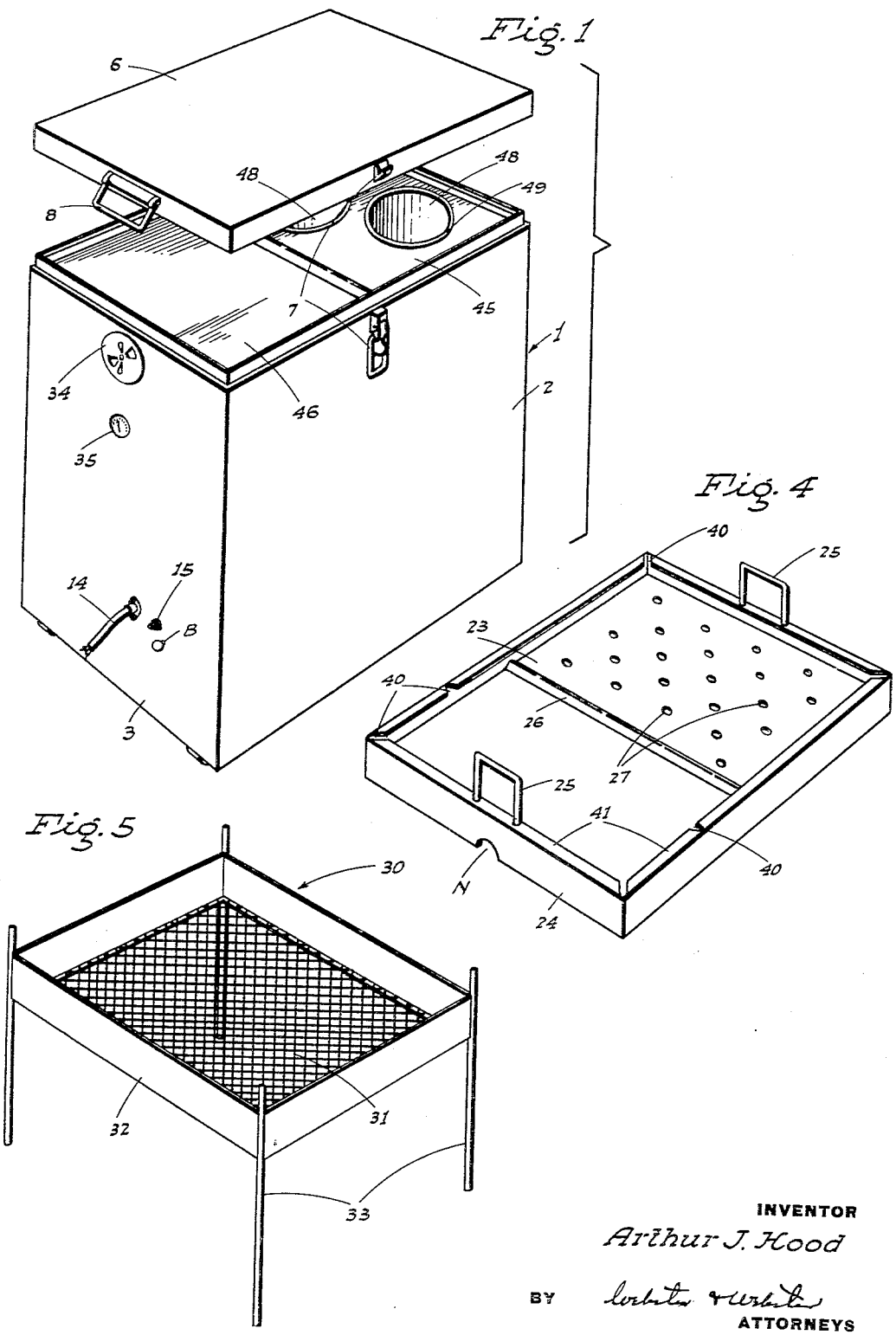
INVENTOR
Arthur J. Hood
BY
ATTORNEYS Dec. 20, 1955 A. J. HOOD 2,727,505
PORTABLE BARBECUE
Filed Sept. 24, 1951 2 Sheets-Sheet 2
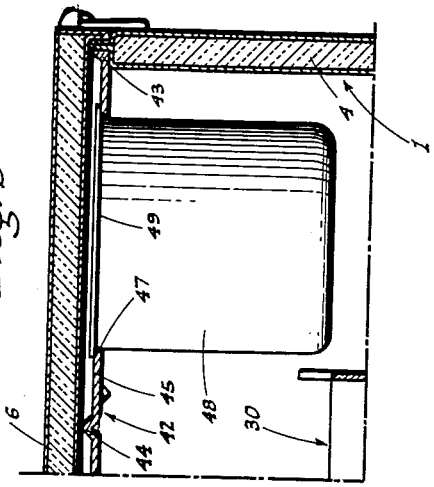
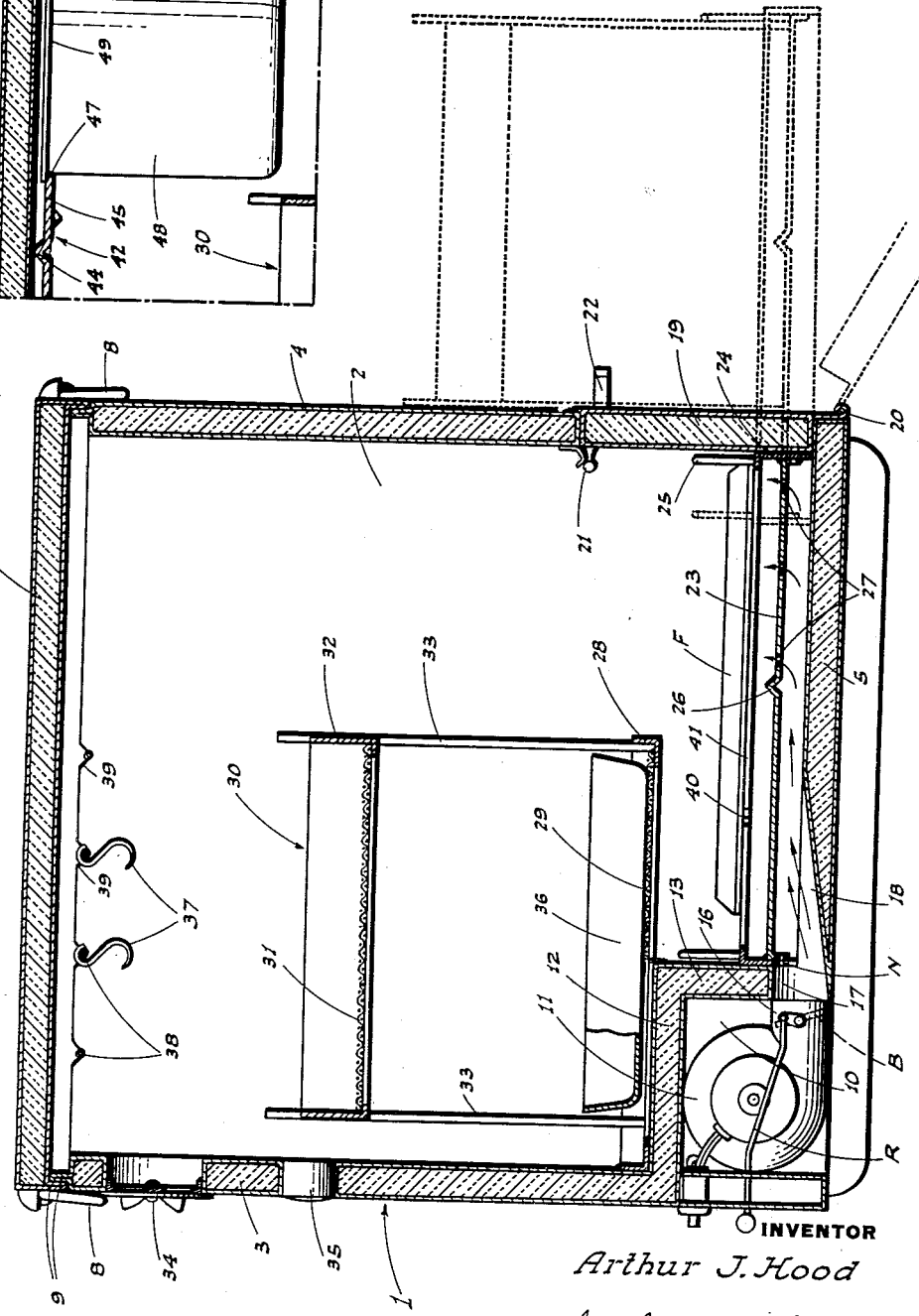
INVENTOR
Arthur J. Hood
BY
ATTORNEYS

United States Patent Office 2,727,505
Patented Dec. 20, 1955

2,727,505

PORTABLE BARBECUE

Arthur J. Hood, Reno, Nev.

Application September 24, 1951, Serial No. 247,924

4 Claims. (Cl. 126—25)

This invention relates in general to an improved barbecue unit.

One important object of the invention is to provide a barbecue unit which is readily and conveniently portable and thus especially adapted for use on picnics, when camping, or the like.

Another important object of the invention is to provide a barbecue unit which embodies cooking devices which are effective for enclosed or oven barbecuing, outside or open barbecuing, frying, and boiling or stewing, selectively, the parts of the barbecue unit being easily manipulated for the different types of cooking, as above.

A separate object of the invention is to provide a barbecue unit which uses a minimum of fuel, such as charcoal, there being a novel blower and controlled draft assembly for initially starting the bed-of-coals fire, or for enlivening it when necessary during cooking operations to increase the temperature.

An additional object of the invention is to provide a barbecue unit which is insulated in a manner to prevent any substantial heat loss during those cooking operations which contemplate retention of the heat in the box which the device includes.

A further object of the invention is to provide a barbecue unit, as in the preceding paragraph, wherein a fire plate and food supporting devices are arranged in the box for most efficient barbecue cooking of the food, yet without likelihood of burning the same.

It is also an object of the invention to provide a barbecue unit which is designed for ease and economy of manufacture.

Still another object of the invention is to provide a practical and reliable portable barbecue, and one which will be exceedingly effective for the purpose for which it is designed.

These objects are accomplished by means of such structure and relative arrangement of parts as will fully appear by a perusal of the following specification and claims.

In the drawings:

Fig. 1 is a perspective view of the barbecue unit with the lid elevated, and the top insert plate in place.

Fig. 2 is an enlarged sectional elevation of the barbecue unit, with the lid in place but without the top insert plate.

Fig. 3 is an enlarged fragmentary sectional elevation of the barbecue unit showing the top insert plate in place below the lid.

Fig. 4 is a perspective view of the fire plate, detached.

Fig. 5 is a perspective view of the grill unit, detached.

Referring now more particularly to the characters of reference on the drawings, the improved barbecue unit is constructed for portable use, and comprises an initially open-top box, indicated generally at 1, which box includes side walls 2, a rear wall 3, a front wall 4, and a bottom 5.

The top of the box 1 is adapted to be closed by a removable lid 6 secured to said box on opposite sides thereof by catches 7, there being lift handles 8 at opposite ends of said lid 6.

When the lid 6 is in place on the box 1, cooperative closure flanges 9 provide an effective seal between the parts.

The box 1 and the lid 6 are of double-wall construction, with suitable insulation material therebetween, as shown, this for the purpose of minimizing heat loss from the box.

In the rear lower portion thereof the box 1 is formed with a full-width, transverse pocket 10, open to the bottom and enclosing an electric motor-driven blower 11, the pocket 10 being defined by a shelf-forming top 12 and a front 13, both likewise of double-wall construction with insulation therebetween.

The electric motor driven blower 11 is energized by a cord 14 having an exteriorally accessible switch 15 interposed therein.

If desired, the motor of the blower 11 may be wound for low voltage operation whereby it may be energized from a motor vehicle battery.

The blower 11 includes a forwardly projecting, cylindrical outlet 16 which discharges through a port 17 in the lower part of the front 13 which defines the pocket 10. In turn, the port 17 is in communication with a forwardly and upwardly inclined channel 18 which opens full length upwardly through the upper surface of the bottom 5 of the box, for the purpose which will hereinafter appear, the direction of air flow being indicated by the arrows in Fig. 2.

The front wall 4 includes, in the lower portion thereof, a full-width door 19 hinged at its lower edge, as at 20, for outward and downward swinging motion to an open position clear of the upper surface of the bottom 5 of the box.

The door 19 is normally maintained closed by a friction catch 21, while said door is fitted on the outside with a handle 22.

The numeral 23 indicates a rectangular fire plate having a vertically extending border frame 24 which projects both above and below said plate. Lift handles 25 project upwardly from the border frame 24 at opposite ends thereof to permit of manipulation of the fire plate 23.

The fire plate 23 is normally disposed in the box 1 seated on the bottom 5 in substantially matching relation to the area defined by the front 13 of the pocket 10, the door 19, and side walls 2.

Substantially centrally of its ends the fire plate 23 is formed with an upstanding, transverse ridge 26, and the portion of said plate ahead of the ridge is formed with perforations, as at 27.

When the fire plate 23 is in use in the box 1, the fire material—such as charcoal—is placed mainly on the perforate forward section of the fire plate 23, and such material is fast-kindled and thence reduced to coals by a draft, created beneath the fire plate 23 and upwardly through perforations 27, produced by the blower 11, there being a downwardly opening notch N in the rear of the border frame 24 centrally of its sides, and overlying the trough 18 and assuring of adequate air entry beneath the fire plate 23 from said blower.

If desired, a rheostat may be included in the blower circuit whereby to control its speed, and consequently the draft. After the fire material has been reduced to a bed of coals very little if any blower draft is required, and—if desired—very slow subsequent burning of the coals can be obtained by spreading them at least in part onto the rear unperforate section of the fire plate, i. e. rearwardly of the upstanding transverse ridge 26. Further control of the draft—when the blower is running—is obtained by the use of a butterfly valve B, in the blower outlet 16, actuated by a manually shiftable rod R accessible from exteriorly of the box.

The fire plate 23 has two positions of use, the first being in the firebox 1, as above described, and the second being in a position extending a substantial distance out of the front of the box when the door 19 is open, this second or latter position of the fire plate being shown in dotted lines in Fig. 2. The fire plate 23 is then held against tilting by top hold-down flanges F on the side walls 2 riding on opposite sides of the border frame 24.

An open rectangular supporting frame 28 of angle iron is fixed in the box 1 atop the shelf 12, extending full width of the box and projecting from the rear wall 3 forwardly to a termination adjacent the transverse vertical plane of the ridge 26 on the fire plate 23. In other words, the rectangular supporting frame 28 projects to a point adjacent but does not directly overlie the perforate forward section of the fire plate 23. Ahead of the front 13 of the pocket 10 the rectangular supporting frame 28 is fitted with a grill 29.

The frame 28 is adapted to support, in removable relation, a barbecue grill unit, indicated generally at 30, such grill unit comprising a rectangular grill 31 fitted with an upstanding border frame 32 having corner legs 33 thereon.

The corner legs 33 rest in the supporting frame 28, as clearly shown in Fig. 2, with the grill 31 thus disposed in a position a considerable distance above and rearwardly offset from the perforate forward section of the fire plate 23.

With a bed of glowing coals on the fire plate 23, the interior of the box 1 is maintained—by convection—at cooking heat, the smoke and fumes escaping from said box by an adjustable vent 34 in the rear wall 3 above the horizontal plane of the grill 31. Immediately below the vent 34 the rear wall 3 is fitted with a thermometer 35 which reads in terms of the internal temperature of the box.

Food to be oven-barbecued, such as roasts, fowl, fish, or the like, is placed on the grill 31, with the drippings being caught in a drip pan 36 resting in the supporting frame 28, in part on the grill 29. For certain types of food it may be desirable to cook the same directly on the grill 29 rather than on the grill 31.

Food may also be suspended in the box 1 for barbecuing, and this is accomplished by employing food-engaging hooks 37 attached to a cross rod 38, removably supported at opposite ends in notches 39 on opposite side walls 2 at the top. Spareribs, for example, are frequently cooked when suspended, and for this type of cooking the barbecue grill unit 31 is first removed and the hooks 37 and rods 38 are placed in service.

For enclosed or oven-barbecuing the lid 6 remains in place on the box 1, saving and excepting the removal of the lid as may be necessary to the placement of the food in, or its removal from, said box.

For barbecue broiling of steaks, chops, fowl, or fish, it is desirable that the cooking be accomplished exteriorly of the box 1. In such event the door 19, which is otherwise used for supplying the material to the fire plate 23, is opened, and such fire plate is slid from its first position in the box 1 to its second position projecting a substantial distance out thereof, as shown in dotted lines in Fig. 1.

After the fire plate 23 is so positioned, the barbecue grill unit 31 is removed from within the box 1 and seated on the fire plate 23 exteriorly and ahead of said box, as likewise shown in dotted lines in Fig. 1.

In order to prevent displacement of the barbecue grill unit 30 from the fire plate 23 when in such exterior position, the corner legs 33 engage in notches 40 in an inturned top flange 41 which the border frame 24 includes.

It should be noted that, as the corner legs 33 extend above the grill 31 a lesser distance than their downward projection, said grill may be disposed at a lower level—in either its inside or outside positions of use—by merely inverting the grill unit.

In use of the fire plate 23 in its exterior position with the barbecue grill unit 30 thereon, it is preferred that the fire be kindled and reduced to glowing coals before the fire plate 23 is withdrawn from the box, this to the end that the blower 11 may be used to aid in the initial kindling and reducing to glowing coals of the fire material on the perforate forward section of the fire plate 23. After the fire material is reduced to glowing coals, the door 19 is opened and the fire plate 23 is withdrawn to its exterior projecting position for reception of the barbecue grill unit 30.

In order that the barbecue unit be adaptable to further types of cooking, particularly frying, boiling, or stewing, the following is provided:

A rectangular top insert plate, indicated generally at 42, is adapted to removably seat on the upper edge of the box 1 within the confines of the cooperating closure flanges 9, the arrangement being such that the lid 6 may be on the box even though the insert plate 42 is in place.

The insert plate 42 includes an upstanding border flange 43 to prevent spillage from the edges, and an upstanding transverse ridge 44 extends across said plate centrally of its ends, separating the plate into a section 45 for suspension type pots, and a section 46 for frying.

The section 45 is formed with a number of relatively large, circular holes 47 through which cylindrical cooking pots 48 depend, being suspended from the plate by rim flanges 49 on said pots. The arrangement is such that the pots 48 may depend into the box 1 without obstruction by the barbecue grill unit 30 when the latter is on the supporting frame 28.

With the lid 6 removed, food may be boiled or stewed in the pots 48, or may be fried on the plate 46, the heat for cooking being derived from glowing coals of fire material on the fire plate 23. For boiling or stewing only, the lid 6 may remain in place.

With the described barbecue unit, foodstuffs can be effectively and tastily prepared by enclosed or oven barbecuing, by outside or open barbecue broiling, by frying, or by boiling or stewing, the several parts or elements of the barbecue unit being readily and conveniently manipulated, dependent on the type of cooking desired.

The barbecue unit is thus very practical and reliable, and—being portable—it may be carried easily in an automobile for use on picnics, when camping, or the like.

Although the barbecue unit is especially designed for portable use, it is not so limited, and it will be recognized that its structure may find adaptation in a fixed type barbecue unit.

Further, regardless of the type of cooking, the described barbecue unit is extremely economical in its consumption of fire material, only a small quantity being required on the fire plate 23 for the accomplishment of cooking over a substantial period of time.

While described herein as a barbecue unit, the device may be termed a "field stove."

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A barbecue unit comprising a box having a bottom, a fire plate in the box adjacent but above the bottom, the box having an opening therein and the fire plate being supported for sliding motion from a first position wholly within the box to a second position extending through the opening and projecting a substantial distance beyond the box while still supported therefrom, a grill, and means adapted to removably support the grill in the box or exteriorly thereof above and from the fire plate when the latter is in said first or second positions, respectively; said last named means comprising legs on the grill, and a frame in the box on which said legs removably seat when the grill is disposed in said box, the legs removably resting on the fire plate when it is in said second position projecting beyond the box.

2. A barbecue unit comprising a box having a bottom and a substantially full-width opening in one end adjacent the bottom, a fire plate slidably supported in the box adjacent the bottom for motion between a first position wholly within the box to a second position extending through the opening and projecting a substantial distance beyond the box, a grill including supporting legs, a frame in the box on which said legs seat and are located when the grill is disposed in said box, the legs resting on the fire plate when it is in said second position projecting beyond the box; and leg engaging and locating means mounted in fixed connection with the fire plate.

3. A barbecue unit comprising a lidded box having front and rear walls, a fireplate in the box adjacent the bottom thereof extending rearwardly from the front wall and having a transverse upstanding rib intermediate its ends, the plate ahead and rearwardly of the rib being perforate and imperforate respectively, a grill supported in the box in a plane above the fireplate and overhanging the imperforate part only of said plate, means to direct a forced draft upwardly through the perforate portion of the fireplate, and a vent in the rear wall of the box above the grill.

4. A unit as in claim 2, in which the grill is invertible and the legs are vertical and parallel; said grill being connected to the legs intermediate the ends of the latter and closer to one end of the legs than the other whereby to enable the grill to be disposed different distances from the fireplate upon inversion of the grill.

References Cited in the file of this patent

UNITED STATES PATENTS

| | | |
|---|---|---|
| 341,924 | Landis | May 18, 1886 |
| 495,507 | Miller | Apr. 18, 1893 |
| 561,856 | Baxter | June 9, 1896 |
| 747,100 | Stockton | Dec. 15, 1903 |
| 796,593 | Mohan | Aug. 8, 1905 |
| 1,040,451 | Stockton | Oct. 8, 1912 |
| 1,540,434 | Stone | June 2, 1925 |
| 1,545,584 | Devereux | July 14, 1925 |
| 1,616,663 | Macomber | Feb. 8, 1927 |
| 1,883,946 | Kingsbaker | Oct. 25, 1932 |
| 2,009,189 | Ash | July 23, 1935 |
| 2,038,226 | Lang | Apr. 21, 1936 |
| 2,143,994 | McGlone | Jan. 17, 1939 |
| 2,307,914 | Bitney | Jan. 12, 1943 |
| 2,477,529 | Sprinkle | July 26, 1949 |
| 2,497,994 | Jones | Feb. 21, 1950 |
| 2,611,357 | Turner | Sept. 23, 1952 |
| 2,638,888 | Molla | May 19, 1953 |

FOREIGN PATENTS

| | | |
|---|---|---|
| 864,422 | France | Apr. 26, 1941 |